Oct. 29, 1963    R. BRANDT    3,108,850
LABELING OF BLOWN PLASTIC CONTAINERS
Filed Nov. 23, 1960

INVENTOR.
ROGER BRANDT
BY Russell L. Root
George W. Reiber
ATTORNEYS

United States Patent Office 3,108,850
Patented Oct. 29, 1963

3,108,850
LABELING OF BLOWN PLASTIC CONTAINERS
Roger Brandt, Andover, Mass., assignor to American Can Company, New York, N.Y., a corporation of New Jersey
Filed Nov. 23, 1960, Ser. No. 71,240
20 Claims. (Cl. 18—55)

This invention relates to the making of hollow articles such as containers by a blow molding process, and more particularly to the application to such articles of suitable indicia or decoration during and as a part of the blow molding step.

It is current practice to manufacture hollow articles by blowing the same from semi-molten parisons of material having the physical properties of polyethylene or other polyolefins. It is, however, normally quite difficult to get anything in the way of ink or other imaging material, or label adhesive, to adhere to the container material, so that serious difficulties are offered to the production of a completely finished and decorated or labeled container.

In other instances labels have been secured by pretreating the container surface after completion in one of various known ways to first render it receptive to adhesive material, and then applying an adhesive coated label thereto, but this requires additional operations and is awkward and costly especially when the container has an irregular shape.

It is an object of the present invention, therefore, to provide an improved labeling or decorating process for blown plastic containers which overcomes the foregoing difficulties.

One method for attaching labels or other decoration of polyolefin material to containers of similar material, which involves placing the label in the blow mold and inflating a semi-molten parison thereagainst, is described in the copending application of Alexander G. Makowski, S.N. 21,807, filed April 12, 1960. It is generally with this method and the refinement and improvement thereof that the present invention is concerned.

In applying the principles set forth in the said copending application it was found that while labels of plastic material such as ordinary polyolefin sheet could under certain circumstances be reliably adhered without pretreatment of the container surface, certain drawbacks were encountered in that the relationship of label thickness, parison temperature and mold temperature proved to be so delicate that slight deviations from the appropriate relationship would sometimes prevent a fully satisfactory bond. Apparently if the temperature at the interface between the inflated parison and the contiguous plastic label material did not rise to a suitable point, the plastic label material would be insufficiently affected and its bond to the container consequently inferior. It was found that this could be taken care of by raising the mold temperature or parison temperature but at the expense of a greatly lengthened mold operation cycle which would impair the production speed of containers to an inacceptable degree.

It is another object of the present invention, therefore, to improve the latitude of the permissible label thickness to parison temperature relationship without necessity for raising mold temperatures or greatly lengthening mold cycles.

It is also usually found desirable to operate under conditions wherein the parison is blown within practical limits at as low a temperature as possible to reduce the setting time necessary in the mold and thus additionally shorten the mold operating cycle. As can be seen, in those situations where label bonding is a problem, the tendency of any reduction in parison temperature in order to take advantage of a shorter cycle would merely further aggravate the label bonding problem.

It is, accordingly, another object of the invention to devise a method and means for blow-bonding a label to a parison such that the parison can be blown at as low a temperature as operatively convenient from a molding standpoint without at the same time impairing the label bond.

One feature of the present invention is the provision of insulating material between the portion of the plastic label material which is contiguous to the container and the mold wall to control the drain-off of heat through the label and the retention of sufficient heat at the container-label interface to insure an adequate bond. In a preferred alternative this insulation takes the form of a paper outer surface on the label itself which may be readily printed with the desired indicia in the ordinary manner.

Another feature of the invention is the provision, in the environment of applying labels containing plastic material during blow molding of polyolefin containers, of a novel plastic material having improved heat-sensitive properties so as to respond reliably to the heating and insulation conditions over a considerable range, including those generated at lower parison blowing temperatures, to give a firm bonding action.

Another feature of the invention is the disposition of the plastic material forming the connection with the container in an improved surface configuration rendering it more receptive to heat and resulting in firmer bonding at lower over-all heat conditions.

Additional objects, features and advantages will appear hereinafter as the description proceeds.

Figure 1:
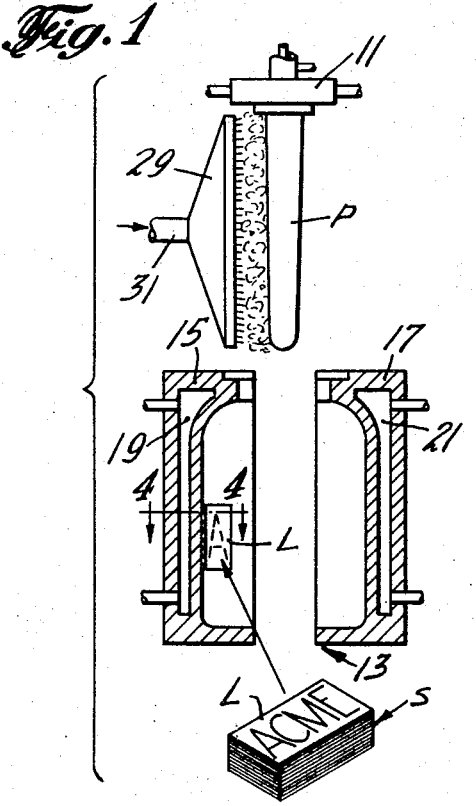
FIG. 1 is a diagrammatic view partly in section and partly in perspective illustrating a blow mold for carrying out the invention with a label in place therein, a parison in readiness to be introduced into the blow mold, and label source from which labels are supplied to the mold.

Referring to the drawing, the present invention is concerned with the production of inscribed or decorated hollow plastic articles made by blow molding, especially containers, and is performed by first making a preform or parison by any suitable known method. In the form illustrated a parison P is produced by injection molding heated semi-liquid polyolefin material such as polyethylene in a suitable parison mold (not shown). The completed parison, cool enough to be momentarily self-supporting but hot enough to remain unset and expansible in response to internal fluid pressure, is carried on a mold part such as neck mold 11 to a blowing position.

As seen in FIG. 1 a blow mold 13 consisting of separable halves 15 and 17 is provided and the same is prepared by temporarily fastening to one of its walls a label L taken from the supply S. The attachment may be accomplished in any of various ways but, in the preferred form, moisture is applied to the outer side and the label forcefully urged against the mold wall to largely eliminate the intervening air layer and thus hold the label in the desired location by unbalanced air pressure.

Figure 2:
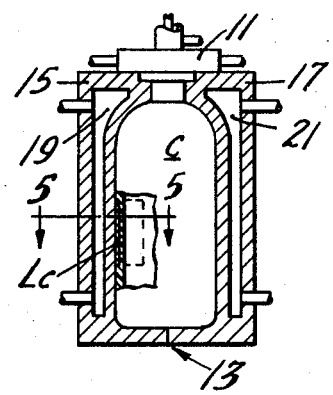
FIG. 2 is an axial section of a blow mold according to FIG. 1, but showing the same closed with the parison inside the mold and inflated thereagainst to form a container, and the container being partially broken away to show the label in section.

When the label L is in place and the parison P has been located between the mold parts 15 and 17, the mold is closed and air pressure admitted to the interior of the parison. This brings about the result illustrated in FIG. 2 wherein the parison has been inflated to form the container C and has adhered itself to and incorporated in its makeup the label, now designated Lc. The mold is held in this position until the container C has been cooled to a set condition by the cooling action of the mold, which is kept at a suitable temperature by passing coolant through the passages 19 and 21 formed for that purpose in the mold halves.

Figure 3:
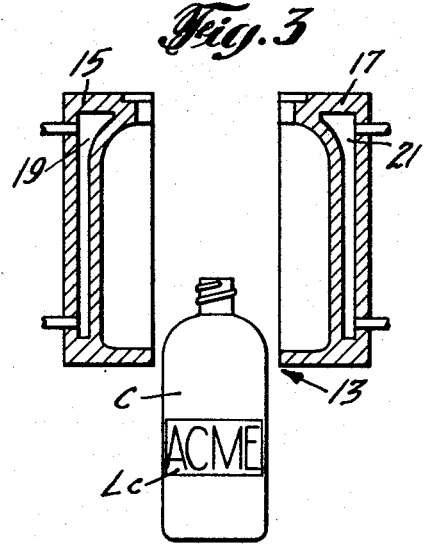
FIG. 3 is view similar to FIG. 1 illustrating the reopening of the mold and removal of the completed and labeled container therefrom.

The mold 13 is opened when the container C has been cooled sufficiently to be permanently self-sustaining and the container is removed with the label Lc permanently attached thereto as seen in FIG. 3.

In one prior form of operation, for example as described in said copending application S.N. 21,807, the label L is made of a plastic, such as branched polyethylene of about .005 inch thickness or less, and is printed on its exterior surface by first pretreating with any of the various known pretreatment methods such as flame treating or corona discharge treating. The label L is attached to the mold as in FIG. 1 with its printed surface outermost and the heretofore described process apparently brings about a softening of the inner label surface due to the heat contained in the parison. The subsequent cooling under inflation pressure normally effects a firm connection between the container and label. In some instances it has been found, however, that when optimum temperature conditions for quantity production are maintained during the blowing operation, such labels may have an inferior bond with the container over a part or the whole of their area.

It has been found that in order to secure the utmost production from a mold the parison P should be at as low an initial temperature as possible consistent with proper inflation, and the temperature of the walls of mold 13 should also be maintained as cool as possible to accelerate setting of the container C once formed. Taking full advantage of either or both of these operating principles, however, has tended to militate somewhat against the integrity of the label bond and the reliability of label attachment.

According to the present invention I have discovered that this tendency can be essentially offset by the novel methods of (1) providing a certain degree of insulation between the plastic label element and the mold wall, (2) adopting a novel plastic material for the plastic portion of the label, (3) altering the conformation of the plastic label bonding surface, and more especially by combinations of these approaches, and that, when the invention is properly applied, parison temperatures and mold temperatures can be selected solely with optimum parison inflation and speedy mold operation in mind, and that the factor of label bonding can be largely relied upon to take care of itself. For example, it is usually considered convenient and practical to inflate a parison of the free extruded tube type when its temperature is about 300° F., and injection molded parisons have been successfully inflated at around 400° F. to 450° F.

Figure 4:
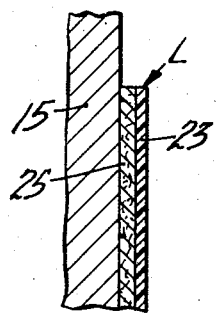
FIG. 4 is an enlarged fragmentary section taken substantially on line 4—4 of FIG. 1.

Initially, placing a layer of insulating material between the plastic label element and the mold wall is illustrated in FIG. 4. Here the label L is shown as made up of a plastic part 23 and an insulating part 25. The preferable manner of handling the insulation so as to have it coincide with the label attachment area is to have it connected with the label as a part thereof. This may be either a temporary readily strippable connection for quick removal when the plastic part of the label is in place, or a relatively permanent connection so that the insulation 25 remains with the label on the completed container and forms the decorated outer surface thereof. It will be understood, of course, that an entirely separate insulation element 25 could be used if desired, but that aggravated handling problems might be encountered. The most practical insulation material found for this purpose has been paper, and various kinds may be used, although a standard label stock about .002 inch in thickness has been found to serve the purpose quite well.

The contiguous plastic material of the label which makes connection with the container may be either a self-sustaining film as heretofore described or may be a spreadable coating carried by the insulating layer or other label member.

Figure 5:
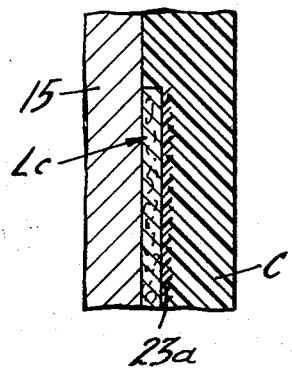
FIG. 5 is an enlargel fragmentary section taken substantially on line 5—5 of FIG. 2.

In operation it appears that the insulation layer 25 momentarily inhibits transfer of the parison heat to the cool mold wall throughout the label area. This apparently allows the portion of the container surface lying within the label area to remain at a slightly higher degree of temperature than the rest of the container for a small increment of time sufficient to produce a reliable softening of the surface of the plastic portion 23, and hence produce a firm bond with the container C as shown in FIG. 5 at 23a. As may be supposed, it is possible to provide excessive insulation under certain circumstances, and when this occurs the label area of the container may remain at too high a temperature after opening the mold, resulting in distortion of the label area. However, when the parison is being blown at minimum blowing temperatures and ordinary thicknesses of paper are used for layer 25, such an occurrence is not to be expected and if found, may be readily corrected by lowering parison temperatures slightly or reducing the insulative value of layer 25 as by using thinner paper.

I have also discovered that, to further insure reliable operation it is possible to substitute other superior resins for the ordinary branched polyethylene film heretofore used in making the contiguous plastic portion of the labels. This improved material is one of several special olefin polymers or copolymers characterized by having a low softening point or being compoundable with other resins or waxes to give a desired softening point such that they can be activated by heat to adhere to polyolefin compositions at lower temperatures than ordinary branched polyethylene. As particular examples of the resins I have discovered to be usable in the present connection, attention is directed to:

(1) A copolymer of ethylene and vinyl acetate marketed under the trademark Elchem 1447C which may, if desired, be compounded with minor proportions of microcrystalline wax, ester gum, rosin, terpenes, and the like; and (2) A low molecular weight branched polyethylene having a molecular weight of about 8000, e.g. one sold under the trademark Epolene C, compoundable with minor proportions of other ingredients, e.g. terpenes and/or microcrystalline wax to give a desired softening temperature.

The resins and compositions described are compatible with the material of the polyolefin container and adhere readily thereto when the latter is pressed thereagainst in semi-molten condition. The compositions here referred to are characterized by low softening temperatures in a range of between 100° F. and 200° F.

The advantages noted in using plastic layers of the types described are that they normally soften at a slightly lower temperature than ordinary branched polyethylene layers and can, moreover, be compounded to act effectively in a particular desired temperature range. They lend themselves readily to hot application by a gravure printing process and thus avoid the complexities of extruding and laminating as well as the possibilities of unpredictable shrinkage effects which are sometimes introduced into extruded plastic sheet by the orientation attendant upon the extrusion process.

Figure 6:
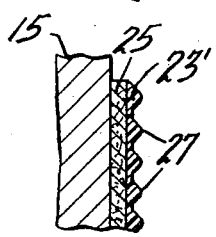
FIG. 6 is an enlarged fragmentary section similar to FIG. 4 but showing an alternate form of the invention.

As a part of the present invention it has also been discovered that reliable label bonding in a container blowing environment is also a function of the surface configuration of the plastic layer. It has been found that if the layer, instead of being a flat, even film, has the surface adjacent the container formed with a large plurality of small high points or ridges, then the reliability of the bond is further improved under marginal temperature circumstances. It appears that the reduced area of the high points or ridges of the plastic material causes them to be more readily and thoroughly softened than is the case when the same material is arranged in a smooth surface, but whatever the explanation this phenomenon of improved bonding is clearly demonstrable. This feature is illustrated in detail in FIG. 6, wherein the plastic layer 23' attached to the insulating layer 25 includes a series of ridges 27, in this case running transverse to the plane of the view. They may, however, be equally well considered as minute points or pyramids which will have a similar functional effect. In the interests of clarity all such configurations, whether ridged or arranged in individual points, will be described as "peaked" and such terminology will be understood as including these various forms of configuration. The capability of the improved plastic layer material to be deposited by gravure printing methods relates particularly well to this feature, since this is a particularly practical and advantageous way to achieve the special surface configuration needed. When the form of label shown in FIG. 6 has been applied to the container, of course, the prominent peaked configuration disappears and the result appears substantially the same as the showing in FIGURE 5.

As explained above, the improved features making up the invention may be used to advantage individually or in various combinations. For example the improved plastic composition may be used flat with a paper insulating layer 25, or with a surface configuration of the type shown in FIG. 6. Also an ordinary molecular weight branched polyethylene film having the surface configuration shown in FIG. 6 and employing an insulating layer may be effectively used. The arrangement shown in FIG. 6 in which the insulating layer 25 is of paper and has applied thereto a layer 23' of the improved low temperature plastic composition heretofore described, arranged with the surface configuration having peaks 27 as shown is probably the preferred combination of the features mentioned.

There is, however, one other arrangement which is thought to have very significant practical value. This is one wherein the insulating layer 25 is a layer of ordinary branched polyethylene or other polyolefin sheet, instead of the paper heretofore mentioned, and a thin layer of the improved plastic composition heretofore described is associated therewith, either in the form shown at 23, FIG. 4, or preferably with the peaked surface configuration of the layer 23' of FIG. 6. While the polyethylene label sheet does not normally have insulative value equivalent to that of the paper sheet, it is found altogether adequate when the thin layer of improved plastic composition 23 or 23' intervenes between it and the container C so that the container blowing operation will still provide an effective bond and the plastic sheet which will have been preprinted or decorated on its external surface will serve as the label or decoration for the finished container. This arrangement has the additional advantage of high scrap recoverability which does not obtain if the label includes paper or other material essentially foreign to the plastic of the container. The connection of the label to the container is of such character that removal of the label once placed is almost always impractical. Grinding paper labels with damaged containers to which they are attached, however, results in scrap which is non-reusable for making additional containers, and which is also of no value for outside sale. By making the outer label layer of a plastic material essentially similar to the container material, the scrap retains a high sale value and is in some instances recoverable in small amounts for feeding back into the container manufacturing process itself with attendant important economies.

As an aid to application of the various features heretofore described, and also effective and beneficial by itself to improve the reliability and accuracy of the labeling operation is a step illustrated diagrammatically in FIG. 1. I have found that if the parison is subjected to high temperature environment for a very brief instant just before blowing, that unusually good results can be expected in the labeling process. As seen in FIG. 1, the parison P on its way to the blow mold is brought adjacent a manifold 29 connected by a conduit 31 with a suitable source of pressurized gas at high temperature, viz. heated air at a temperature of about 500°–600° F. or above. The hot gas is allowed to impinge momentarily over the whole exterior surface of the parison P, and then the latter is placed in the blow mold 13 and inflated as previously described. For the sake of convenience, the process described which consists essentially of instantaneously exposing the parison exterior to a high temperature environment is called "flash heating" and the same will be referred to in this manner hereinafter.

It will be understood that the flash heating operation just described does not, in fact, basically alter the heat content of the parison or the temperature of the main body of material thereof, since this is already at a proper selected blowing temperature. Apparently what occurs is the creation of a very thin exterior layer or skin of properly heated or of superheated material which acts immediately on the label material to insure its proper softening and adhesion when the parison inflation occurs. The fact has been discovered that the parison, when injection molded, is formed in a cooled parison mold and as a result exhibits a surface or skin notably cooler than the body of the parison material which is at a temperature for proper inflation, e.g. 400° F. On the other hand, if the parison is extruded as a tube, its temperature, while perhaps more uniform, is at a lower average value so as to be self-sustaining and hence problems in attaching labels are encountered. In either case, flash heating the parison as heretofore described corrects the situation and provides a parison with an extremely thin layer of surface material at a temperature such that it is ready to make contact with and attach itself firmly to the label in the blow mold if promptly transferred thereto. The flash heating treatment described proves very beneficial by itself, and also in combination with any one or more of the approaches (1), (2) and (3) hereinabove set out in detail. In addition it is noted that the flash heating treatment described can be of special benefit when it is desired to make direct connection between a polyolefin parison and a thin sheet of polyolefin material without making use of an intervening layer of special low temperature plastic material as hereinbefore described, and where this type of connection was formerly hemmed in by critical temperatures and practical operating difficulties, the flash heating step has now rendered it quite readily and easily usable as a production technique.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. The process of manufacturing a blown container of polyolefin material with a label firmly bonded to the exterior thereof which comprises providing a label having at least as a part thereof a plastic layer with first and second surfaces and consisting essentially of a resin selected from the group consisting of copolymers of ethylene and vinyl acetate and polyethylene having a molecular weight of about 8000 and having on its first surface a configuration comprising a large multiplicity of small peaks, placing said plastic layer and an insulaing layer on the inner surface of a cooled blow mold with the insulating layer against the blow mold and the second surface of the plastic layer against the insulating layer, placing a semi-molten parison of polyolefin material within the blow mold, inflating the parison to bring it into pressure contact with the first surface of said plastic layer to soften the same by the parison heat and merge the parison surface therewith to form an assembly, and cooling the assembly by contact with the mold while the inflated parison is pressed against the thus softened surface of the plastic layer by the inflating pressure.

2. The process as set forth in claim 1 in which the insulating layer is a piece of paper.

3. The process as set forth in claim 2 in which the insulating layer is a piece of paper substantially equivalent in outline to said plastic layer and attached thereto on the second surface thereof, and printed on its outer surface with the decoration which it is desired to apply to the container.

4. The process of manufacturing a blown container of polyolefin material with a label firmly bonded to the exterior thereof which comprises providing a label having at least as a part thereof a plastic layer with first and second surfaces and consisting essentially of a resin selected from the group consisting of copolymers of ethylene and vinyl acetate and polyethylene having a molecular weight of about 8000 and having on its first surface a configuration comprising a large multiplicity of small peaks, placing said label on the inner surface of a cooled blow mold with second surface of the plastic layer towards the blow mold surface, placing a semi-molten parison of polyolefin material within the blow mold, inflating the parison to bring it into pressure contact with the first surface of said plastic layer to soften the same by the parison heat and merge the parison surface therewith to form an assembly, and cooling the assembly by contact with the mold with the inflated parison pressed against the thus softened surface of the plastic layer by the inflating pressure.

5. The process of manufacturing a blown container of polyolefin material with a label firmly bonded to the exterior thereof which comprises providing a label having at least as a part thereof a plastic layer with first and second surfaces and having on its first surface a configuration comprising a large multiplicity of small peaks, placing said plastic layer and an insulating layer on the inner surface of a cooled blow mold with the insulating layer against the blow mold and the second surface of the plastic layer against the insulating layer, placing a semi-molten parison of polyolefin material within the blow mold, inflating the parison to bring it into pressure contact with the first surface of said plastic layer to soften the same by the parison heat and merge the parison surface therewith to form an assembly, and cooling the assembly by contact with the mold while the inflated parison is pressed against the thus softened surface of the plastic layer by the inflating pressure.

6. The process of manufacturing a blown container of polyolefin material with a label firmly bonded to the exterior thereof which comprises providing a label having at least as a part thereof a plastic layer consisting essentially of a resin selected from the group consisting of copolymers of ethylene and vinyl acetate and polyethylene having a molecular weight of about 8000, placing said plastic layer and an insulating layer on the inner surface of a cooled blow mold with the insulating layer against the blow mold and a surface of the plastic layer against the insulating layer, placing a semi-molten parison of polyolefin material within the blow mold, inflating the parison to bring it into pressure contact with the surface of said plastic layer to soften the same by the parison heat and merge the parison surface therewith to form an assembly, and cooling the assembly by contact with the mold while the inflated parison is pressed against the thus softened surface of the plastic layer by the inflating pressure.

7. The process of manufacturing a blown container of polyolefin material with a label firmly bonded to the exterior thereof which comprises providing a label having at least as a part thereof a plastic layer with first and second surfaces and having on its first surface a configuration comprising a large multiplicity of small peaks, placing said label on the inner surface of a cooled blow mold with the second surface of the plastic layer towards the blow mold surface, placing a semi-molten parison of polyolefin material within the blow mold, inflating the parison to bring it into pressure contact with the first surface of said plastic layer to soften the same by parison heat and merge the parison surface therewith to form an assembly, and cooling the assembly by contact with the mold while the inflated parison is pressed against the thus softened surface of the plastic layer by the inflating pressure.

8. The process of manufacturing a blown container of polyolefin material with a label firmly bonded to the exterior thereof which comprises providing a label having at least as a part thereof a plastic layer consisting essentially of a resin selected from the group consisting of copolymers of ethylene and vinyl acetate and polyethylene having a molecular weight of about 8000, placing said label on the inner surface of a cooled blow mold, placing a semi-molten parison of polyolefin material within the blow mold, inflating the parison to bring it into pressure contact with the surface of said plastic layer to soften the same by parison heat and merge the parison surface therewith to form an assembly, and cooling the assembly by contact with the mold while the inflated parison is pressed against the thus softened surface of the plastic layer by the inflating pressure.

9. The process of manufacturing a blown container of polyolefin material with a label firmly bonded to the exterior thereof which comprises providing a label having at least as a part thereof a plastic layer, placing said plastic layer and an insulating layer on the inner surface of a cooled blow mold with the insulating layer against the blow mold and the plastic layer against the insulating layer, placing a semi-molten parison of polyolefin material within the blow mold, inflating the parison to bring it into pressure contact with the surface of said plastic layer to soften the same by parison heat and merge the parison surface therewith to form an assembly, and cooling the assembly by contact with the mold while the inflated parison is pressed against the thus softened surface of the plastic layer by the inflating pressure.

10. The process as set forth in claim 9 in which the insulating layer is a piece of paper.

11. The process as set forth in claim 10 in which the insulating layer is a piece of paper substantially equivalent in outline to said plastic layer, is attached thereto, and is printed on its outer surface with the decoration which it is desired to apply to the container.

12. The process of manufacturing a blown container of polyolefin material with a label firmly bonded to the exterior thereof which comprises providing an imprinted sheet of polyolefin material, applying to a surface thereof a plastic layer consisting essentially of a resin selected from the group consisting essentially of copolymers of ethylene and vinyl acetate and polyethylene having a molecular weight of about 8000, placing the thus combined sheet and layer on the inner surface of a cooled blow mold with the sheet against the blow mold, placing a semi-molten parison of polyolefin material within the blow mold, inflating the parison to bring it into pressure contact with the surface of said layer to soften the same by parison heat and merge the parison surface therewith to form an assembly, and cooling the assembly by contact with the mold while the inflated parison is pressed against the thus softened surface of the plastic layer by the inflating pressure.

13. The process as set forth in claim 12 wherein the layer is applied to the sheet with an exposed surface configuration comprising a large multiplicity of small peaks.

14. The process of manufacturing a blown container of polyolefin material with a label firmly bonded to the exterior thereof which comprises providing a label having at least as a part thereof a plastic layer, placing said label on the inner surface of a cooled blow mold, preparing a semi-molten parison of polyolefin material, flash heating the parison to provide thereon a thin surface layer of material at a temperature such that it is readily bondable with said plastic label element, placing the flash heated parison promptly within the blow mold, inflating the parison to bring it into pressure contact with the surface of said plastic layer to soften the same by parison heat and merge the parison surface therewith to form an assembly, and cooling the assembly by contact with the mold while the inflated parison is pressed against the thus softened surface of the plastic layer by the inflating pressure.

15. The process as set forth in claim 14 in which said plastic layer is prepared essentially of a resin selected from the group consisting of copolymers of ethylene and vinyl acetate and polyethylene having a molecular weight of about 8000.

16. The process as set forth in claim 14 in which said plastic layer is prepared with a surface configuration comprising a large multiplicity of small peaks and placed in the blow mold with said surface configuration away from the mold wall and directed towards the parison when in place.

17. The process as set forth in claim 14 which further includes the step of placing an insulating layer between the plastic layer and the blow mold wall prior to inflation of the parison.

18. The process of manufacturing a blown container of polyolefin material with a label firmly bonded to the exterior thereof which comprises providing a label having at least as a part thereof a plastic layer with first and second surfaces and consisting essentially of a resin selected from the group consisting of copolymers of ethylene and vinyl acetate and polyethylene having a molecular weight of about 8000 and having on its first surface a configuration comprising a large multiplicity of small peaks, placing said plastic layer and an insulating layer on the inner surface of a cooled blow mold with the insulating layer against the blow mold and the second surface of the plastic layer against the insulating layer, preparing a semi-molten parison of polyolefin material, flash heating the parison to provide thereon a thin surface layer of material at a temperature such that it is readily bondable with said plastic layer, placing the parison within the blow mold, inflating the parison to bring it into pressure contact with the first surface of said plastic layer to soften the same by the parison heat and merge the parison surface therewith to form an assembly, and cooling the assembly by contact with the mold while the inflated parison is pressed against the thus softened surface of the plastic label element by the inflating pressure.

19. The process of manufacturing a blown container of polyolefin material with a label firmly bonded to the exterior thereof which comprises providing an imprinted sheet of polyolefin material, applying to a surface thereof a plastic layer consisting essentially of a resin selected from the group consisting essentially of copolymers of ethylene and vinyl acetate and polyethylene having a molecular weight of about 8000, placing the thus combined sheet and layer on the inner surface of a cooled blow mold with the sheet against the blow mold, preparing a semi-molten parison of polyolefin material, flash heating the parison to provide thereon a thin surface layer of material at a temperature such that it is readily bondable with said plastic label element, placing the parison within the blow mold, inflating the parison to bring it into pressure contact with the surface of said layer to soften the same by parison heat and merge the parison surface therewith to form an assembly, and cooling the assembly by contact with the mold while the inflated parison is pressed against the thus softened surface of the plastic layer by the inflating pressure.

20. The process of manufacturing a blown container of polyolefin material with a label firmly bonded to the exterior thereof which comprises providing an imprinted sheet of polyolefin material, placing the sheet on the inner surface of a cooled blow mold, preparing a semi-molten parison of polyolefin material, flash heating the parison to provide thereon a thin surface layer of material at a temperature such that it is readily bondable directly with said plastic material of said sheet, placing the parison within the blow mold, inflating the parison to bring it into pressure contact with the surface of said sheet to soften the same by parison heat and merge the parison surface therewith to form an assembly, and cooling the assembly by contact with the mold while the inflated parison is pressed against the thus softened surface of the sheet by the inflating pressure.

References Cited in the file of this patent
UNITED STATES PATENTS

| Number | Name | Date |
|---|---|---|
| Re. 2,631 | Walton | May 23, 1867 |
| 1,052,081 | Miltner | Feb. 4, 1913 |
| 1,744,438 | Benson | Jan. 21, 1930 |
| 2,356,399 | Hansen | Aug. 22, 1944 |
| 2,597,558 | Bailey | May 20, 1952 |
| 2,632,202 | Haines | Mar. 24, 1953 |
| 2,874,419 | May et al. | Feb. 24, 1959 |
| 2,959,812 | Allen | Nov. 15, 1960 |
| 2,967,330 | Tommarchi | Jan. 10, 1961 |